(12) United States Patent
Song et al.

(10) Patent No.: US 11,296,347 B2
(45) Date of Patent: Apr. 5, 2022

(54) FLOW BATTERY CLEANSING CYCLE TO MAINTAIN ELECTROLYTE HEALTH AND SYSTEM PERFORMANCE

(71) Applicant: ESS TECH, INC., Wilsonville, OR (US)

(72) Inventors: Yang Song, West Linn, OR (US); Craig E. Evans, West Linn, OR (US)

(73) Assignee: ESS TECH, INC., Wilsonville, OR (US)

( * ) Notice: Subject to any disclaimer, the term of this patent is extended or adjusted under 35 U.S.C. 154(b) by 381 days.

(21) Appl. No.: 15/965,722

(22) Filed: Apr. 27, 2018

(65) Prior Publication Data

US 2018/0316037 A1   Nov. 1, 2018

Related U.S. Application Data

(60) Provisional application No. 62/491,964, filed on Apr. 28, 2017.

(51) Int. Cl.
| | | |
|---|---|---|
| H01M 8/18 | (2006.01) | |
| G06K 9/00 | (2006.01) | |
| H01M 8/04537 | (2016.01) | |
| H01M 8/04858 | (2016.01) | |
| H01M 8/06 | (2016.01) | |
| H01M 8/04186 | (2016.01) | |

(52) U.S. Cl.
CPC .......... *H01M 8/188* (2013.01); *G06K 9/0002* (2013.01); *G06K 9/0012* (2013.01); *H01M 8/04186* (2013.01); *H01M 8/04611* (2013.01); *H01M 8/04932* (2013.01); *H01M 8/0693* (2013.01)

(58) Field of Classification Search
CPC ............. H01M 8/188; H01M 8/04186; H01M 8/04611; H01M 8/04932; H01M 8/0693; G06K 9/0002; G06K 9/0012

USPC .......................................................... 429/51
See application file for complete search history.

(56) References Cited

U.S. PATENT DOCUMENTS

| | | | |
|---|---|---|---|
| 6,692,862 B1 | 2/2004 | Zocchi | |
| 7,800,345 B2 | 9/2010 | Yun et al. | |
| 9,509,011 B2 | 11/2016 | Evans et al. | |
| 2011/0086247 A1 | 4/2011 | Keshavarz et al. | |
| 2013/0084506 A1* | 4/2013 | Chang | G01R 31/382 429/400 |
| 2014/0186731 A1 | 7/2014 | Pham et al. | |

(Continued)

FOREIGN PATENT DOCUMENTS

WO   2013027076 A1   2/2013

OTHER PUBLICATIONS

ISA Korean Intellectual Property Office, International Search Report and Written Opinion Issued in Application No. PCT/US2018/030024, dated Aug. 29, 2018, WIPO, 8 pages.
Song, Y. et al., "Methods and System for a Battery," U.S. Appl. No. 15/965,673, filed Apr. 27, 2018, 66 pages.

(Continued)

*Primary Examiner* — Christian Roldan
(74) *Attorney, Agent, or Firm* — McCoy Russell LLP (57) ABSTRACT

A method of cleansing a redox flow battery system may include operating the redox flow battery system in a charge, discharge, or idle mode, and responsive to a redox flow battery capacity being less than a threshold battery capacity, mixing the positive electrolyte with the negative electrolyte. In this way, battery capacity degradation following cyclic charging and discharging of the redox flow battery system can be substantially reduced.

16 Claims, 5 Drawing Sheets

(56) References Cited

U.S. PATENT DOCUMENTS

| | | | |
|---|---|---|---|
| 2014/0363747 A1* | 12/2014 | Evans | H01M 8/20 |
| | | | 429/409 |
| 2015/0255824 A1 | 9/2015 | Evans et al. | |
| 2016/0006054 A1 | 1/2016 | Li et al. | |
| 2016/0013505 A1* | 1/2016 | Darling | H01M 8/20 |
| | | | 429/418 |
| 2016/0093925 A1 | 3/2016 | Li et al. | |
| 2016/0293992 A1 | 10/2016 | Song et al. | |
| 2016/0315337 A1 | 10/2016 | Perry et al. | |
| 2016/0315339 A1 | 10/2016 | Darling et al. | |
| 2017/0040630 A1 | 2/2017 | Song et al. | |

OTHER PUBLICATIONS

Song, Y. et al., "Methods and Systems for Operating a Redox Flow Battery System," U.S. Appl. No. 15/965,709, filed Apr. 27, 2018, 44 pages.

Evans, C., "Methods and Systems for Rebalancing Electrolytes for a Redox Flow Battery System," U.S. Appl. No. 15/965,728, filed Apr. 27, 2018, 50 pages.

Song, Y. et al., "Integrated Hydrogen Recycle System Using Pressurized Multichamber Tank," U.S. Appl. No. 15/965,627, filed Apr. 27, 2018, 50 pages.

Song, Y. et al., "Methods and Systems for Redox Flow Battery Electrolyte Hydration," U.S. Appl. No. 15/965,671, filed Apr. 27, 2018, 56 pages.

European Patent Office, Extended European Search Report Issued in Application No. 18791362.9, dated Nov. 23, 2020, Germany, 10 pages.

\* cited by examiner

FLOW BATTERY CLEANSING CYCLE TO MAINTAIN ELECTROLYTE HEALTH AND SYSTEM PERFORMANCE

CROSS REFERENCE TO RELATED APPLICATIONS

The present application claims priority to U.S. Provisional Application No. 62/491,964, entitled "Flow Battery Cleansing Cycle to Maintain Electrolyte Health and System Performance", and filed on Apr. 28, 2017. The entire contents of the above-listed application are hereby incorporated by reference for all purposes.

ACKNOWLEDGMENT OF GOVERNMENT SUPPORT

This invention was made with government support under contract no. DEAR0000261 awarded by the DOE, Office of ARPA-E. The government has certain rights in the invention.

FIELD

The present description relates generally to a method for operating a redox flow battery system.

BACKGROUND

Capacity degradation is a costly problem faced in the operation of all batteries. Capacity degradation results, for example, from positive or negative electrode side reactions, internal shorting, ionic movement, or the like over a battery's lifetime. In the specific example of an iron redox flow battery, side reactions on the negative side include hydrogen evolution, as well as iron corrosion by proton ($H^+$) and ferric ($Fe^{3+}$) ions. Each of the side reactions adds to an imbalance in the positive electrolyte of the system, resulting in capacity degradation which can grow over time and shorten the useful life of the battery.

In general, redox flow battery systems may have a lower rate of capacity loss compared to traditional batteries by using external (relative to the battery cell) subsystems to manage positive and negative electrolyte states of health. For example, Evans (U.S. Pat. No. 9,509,011) discloses a redox flow battery system with subsystems used to rebalance and manage the chemical states of positive electrolytes. In another example, Li (U.S. Patent Application 2016/0006054) discloses a redox flow system where additional chemicals may be added to a redox flow battery system to reduce the imbalance in the positive electrolyte.

The inventors herein have recognized potential disadvantages with the methods described above. Specifically, the addition of other chemicals requires separate tanks and an overall increase in system complexity and cost. Furthermore, due to subsystem inefficiencies, over time and repeated cycles, electrolyte imbalance and therefore capacity degradation may not be sufficiently mitigated.

In one example, the aforementioned issues may at least partially be addressed by a method of operating a redox flow battery system, including, circulating a positive electrolyte between a positive electrode compartment and a positive electrolyte chamber with a positive electrolyte pump, circulating a negative electrolyte between a negative electrode compartment and a negative electrolyte chamber with a negative electrolyte pump, and responsive to a first condition, including when a redox flow battery capacity is less than a threshold battery capacity, performing a battery cleansing cycle, including mixing the positive electrolyte with the negative electrolyte until a redox flow battery state of charge (SOC) is less than a threshold SOC.

In this way, the systems and methods described herein may maintain increased redox flow battery system electrolyte health, including reduced battery system capacity degradation caused by repeated and cyclic charging and discharging, as compared with conventional battery systems. In particular, the systems and methods described herein enable operation of redox flow battery systems for an increased number of cycles without experiencing a loss of capacity greater than a threshold capacity loss. Furthermore, the methods and systems described herein may be performed while utilizing existing electrolyte storage chambers, and without further additional electrolyte storage tanks, thereby reducing a system complexity and cost.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An example electrolyte cleansing method for a redox flow battery system is described herein. The cleansing method (or cleansing mode) may be employed with a redox flow battery system, as described in FIG. 1, to maintain electrolyte health and system performance. The method is designed for operation with redox flow battery systems where the same electrolyte chemistry is employed in both positive and negative electrolytes, resulting in systems that may operate for an unlimited number of recharge cycles without experiencing battery capacity degradation. In at least one embodiment, the cleansing method may comprise a control mechanism to determine the battery capacity and direct the system implement a series of steps based upon comparing the determined battery capacity to a pre-set target.

Hybrid redox flow batteries are redox flow batteries that are characterized by the deposit of one or more of the electro-active materials as a solid layer on an electrode. Hybrid redox flow batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid battery systems, the charge capacity (e.g., amount of energy stored) of the redox battery may be limited by the amount of metal plated during battery charge and may accordingly depend on the efficiency of the plating system as well as the available volume and surface area available for plating.

In a redox flow battery system the negative electrode 26 may be referred to as the plating electrode and the positive electrode 28 may be referred to as the redox electrode. The negative electrolyte within the plating side (e.g., negative electrode compartment 20) of the battery may be referred to as the plating electrolyte and the positive electrolyte on the redox side (e.g. positive electrode compartment 22) of the battery may be referred to as the redox electrolyte.

Anode refers to the electrode where electro-active material loses electrons and cathode refers to the electrode where electro-active material gains electrons. During battery charge, the positive electrolyte gains electrons at the negative electrode 26; therefore the negative electrode 26 is the cathode of the electrochemical reaction. During discharge, the positive electrolyte loses electrons; therefore the negative electrode 26 is the anode of the reaction. Accordingly, during charge, the negative electrolyte and negative electrode may be respectively referred to as the catholyte and cathode of the electrochemical reaction, while the positive electrolyte and the positive electrode may be respectively referred to as the anolyte and anode of the electrochemical reaction. Alternatively, during discharge, the negative electrolyte and negative electrode may be respectively referred to as the anolyte and anode of the electrochemical reaction, while the positive electrolyte and the positive electrode may be respectively referred to as the catholyte and cathode of the electrochemical reaction. For simplicity, the terms positive and negative are used herein to refer to the electrodes, electrolytes, and electrode compartments in redox battery flow systems.

One example of a hybrid redox flow battery is an all iron redox flow battery (IFB), in which the electrolyte comprises iron ions in the form of iron salts (e.g., $FeCl_2$, $FeCl_3$, and the like), wherein the negative electrode comprises metal iron. For example, at the negative electrode, ferrous ion, $Fe^{2+}$, receives two electrons and plates as iron metal on to the negative electrode 26 during battery charge, and iron metal, $Fe^0$, loses two electrons and re-dissolves as $Fe^{2+}$ during battery discharge. At the positive electrode, $Fe^{2+}$ loses an electron to form ferric ion, $Fe^{3+}$, during charge, and during discharge $Fe^{3+}$ gains an electron to form $Fe^{2+}$. The electrochemical reaction is summarized in equations (1) and (2), wherein the forward reactions (left to right) indicate electrochemical reactions during battery charge, while the reverse reactions (right to left) indicate electrochemical reactions during battery discharge:

$$Fe^{2+} + 2e^- \leftrightarrow Fe^0 -0.44 \text{ V (Negative Electrode)} \quad (1)$$

$$2Fe^{2+} \leftrightarrow 2Fe^{3+} + 2e^- +0.77 \text{ V (Positive Electrode)} \quad (2)$$

As discussed above, the negative electrolyte used in the all iron redox flow battery (IFB) may provide a sufficient amount of $Fe^{2+}$ so that, during charge, $Fe^{2+}$ can accept two electrons from the negative electrode to form $Fe^0$ and plate onto a substrate. During discharge, the plated $Fe^0$ may then lose two electrons, ionizing into $Fe^{2+}$ and be dissolved back into the electrolyte. The equilibrium potential of the above reaction is −0.44V and thus this reaction provides a negative terminal for the desired system. On the positive side of the IFB, the electrolyte may provide $Fe^{2+}$ during charge which loses electron and oxidizes to $Fe^{3+}$. During discharge, $Fe^{3+}$ provided by the electrolyte becomes $Fe^{2+}$ by absorbing an electron provided by the electrode. The equilibrium potential of this reaction is +0.77V, creating a positive terminal for the desired system.

The IFB provides the ability to charge and recharge its electrolytes in contrast to other battery types utilizing non-regenerating electrolytes. Charge is achieved by applying a current across the electrodes via terminals 40 and 42. The negative electrode may be coupled via terminal 40 to the negative side of a voltage source so that electrons may be delivered to the negative electrolyte via the positive electrode (e.g., as $Fe^{2+}$ is oxidized to $Fe^{3+}$ in the positive electrolyte in the positive electrode compartment 22). The electrons provided to the negative electrode 26 (e.g., plating electrode) can reduce the $Fe^{2+}$ in the negative electrolyte to form $Fe^0$ at the plating substrate causing it to plate onto the negative electrode.

Discharge can be sustained while $Fe^0$ remains available to the negative electrolyte for oxidation and while $Fe^{3+}$ remains available in the positive electrolyte for reduction. As an example, $Fe^{3+}$ availability can be maintained by increasing the concentration or the volume of the positive electrolyte to the positive electrode compartment 22 side of cell 18 to provide additional $Fe^{3+}$ ions via an external source, such as an external positive electrolyte chamber or positive electrolyte chamber 52. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{2+}$ in the negative electrode compartment 20. As an example, $Fe^{2+}$ availability can be maintained by providing additional $Fe^{2+}$ ions via an external source, such as an external negative electrolyte chamber 50 to increase the concentration or the volume of the negative electrolyte to the negative electrode compartment 20 side of cell 18.

In an IFB, the positive electrolyte comprises ferrous ion, ferric ion, ferric complexes, or any combination thereof, while the negative electrolyte comprises ferrous ion or ferrous complexes, depending on the state of charge of the IFB system. As previously mentioned, utilization of iron ions in both the negative electrolyte and the positive electrolyte allows for utilization of the same electrolytic species on both sides of the battery cell, which can reduce electrolyte cross-contamination and can increase the efficiency of the IFB system, resulting in less electrolyte replacement as compared to other redox flow battery systems.

Efficiency losses in an IFB may result from electrolyte crossover through the separator 24 (e.g., ion-exchange membrane barrier, micro-porous membrane, and the like). For example, ferric ions in the positive electrolyte may be driven toward the negative electrolyte by a ferric ion concentration gradient and an electrophoretic force across the separator. Subsequently, ferric ions penetrating the membrane barrier and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) can result in precipitation of $Fe(OH)_3$. Precipitation of $Fe(OH)_3$ can damage the separator 24 and cause permanent battery performance and efficiency losses. For example, $Fe(OH)_3$ precipitate may chemically foul the organic functional group of an ion-exchange membrane or physically clog the small micro-pores of an ion-exchange membrane. In either case, due to the $Fe(OH)_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, adding to process cost and complexity. Adding specific organic acids to the positive electrolyte and the negative electrolyte in response to electrolyte pH changes may also mitigate precipitate formation during battery charge and discharge cycling.

Additional coulombic efficiency losses may be caused by reduction of H$^+$ (e.g., protons) and subsequent formation of H$_2$ (e.g., hydrogen gas), and the reaction of protons in the negative electrode compartment 20 with electrons supplied at the plated iron metal electrode to form hydrogen gas.

The IFB electrolyte (e.g., FeCl$_2$, FeCl$_3$, FeSO$_4$, Fe$_2$(SO$_4$)$_3$, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

During charge of an IFB, for example, ferrous ion, Fe$^{2+}$, is reduced (accepts two electrons in a redox reaction) to metal iron, Fe$^0$, at the negative electrode. Simultaneously, at the positive electrode, ferrous ion, Fe$^{2+}$, is oxidized (loss of an electron) to ferric ion, Fe$^{3+}$. Concurrently, at the negative electrode, the ferrous iron reduction reaction competes with the reduction of protons, H$^+$, wherein two protons each accept a single electron to form hydrogen gas, H$_2$ and the corrosion of iron metal to produce ferrous ion, Fe$^{2+}$. The production of hydrogen gas through reduction of hydrogen protons and the corrosion of iron metal are shown in equations (3) and (4), respectively:

H$^+$+e$^-$↔½H$_2$ (proton reduction)　　　　　　(3)

Fe$^0$+2H$^+$↔Fe$^{2+}$+H$_2$ (iron corrosion)　　　　　　(4)

As a result, the negative electrolyte in the negative electrode compartment 20 tends to stabilize at a pH range between 3 and 6. At the positive electrode compartment 22, ferric ion, Fe$^{3+}$, has a much lower acid disassociation constant (pKa) than that of ferrous ion, Fe$^{2+}$. Therefore, as more ferrous ions are oxidized to ferric ions, the positive electrolyte tends to stabilize at a pH less than 2, in particular at a pH closer to 1.

Accordingly, maintaining the positive electrolyte pH in a first range in which the positive electrolyte (positive electrode compartment 22) remains stable and maintaining the negative electrolyte pH in a second range in which the negative electrolyte (negative electrode compartment 20) remains stable may reduce low cycling performance and increase efficiency of redox flow batteries. For example, maintaining a pH of a negative electrolyte in an IFB between 3 and 4 may reduce iron corrosion reactions and increase iron plating efficiency, while maintaining a pH of a positive electrolyte less than 2, in particular less than 1, may promote the ferric/ferrous ion redox reaction and reduce ferric hydroxide formation.

As indicated by equation (3) and (4), evolution of hydrogen can cause electrolyte imbalance in a redox flow battery system. For example, during charge, electrons flowing from the positive electrode to the negative electrode (e.g., as a result of ferrous ion oxidation), may be consumed by hydrogen evolution via equation (3), thereby reducing the electrons available for plating given by equation (1). Because of the reduced plating, battery charge capacity is reduced. Additionally, corrosion of the iron metal further reduces battery capacity since a decreased amount of iron metal is available for battery discharge. Thus, an imbalanced electrolyte state of charge between the positive electrode compartment 22 and the negative electrode compartment 20 can develop as a result of hydrogen production via reaction (3) and (4). Furthermore, hydrogen gas production resulting from iron metal corrosion and proton reduction both consume protons, which can result in a pH increase of the negative electrolyte. As discussed above with reference to FIG. 1, an increase in pH may destabilize the electrolyte in the redox battery flow system, resulting in further battery capacity and efficiency losses.

An approach that addresses the electrolyte rebalancing issues that can be caused by hydrogen gas production in redox flow battery systems comprises reducing the imbalanced ion in the positive electrolyte with hydrogen generated from the side reactions. As an example, in an IFB system, the positive electrolyte comprising ferric ion may be reduced by the hydrogen gas according to equation (5):

Fe$^{3+}$+½H$_2$→Fe$^{2+}$+H$^+$　　　　　　(5)

In the IFB system example, by reacting ferric ion with hydrogen gas, the hydrogen gas can be converted back to protons, thereby maintain a substantially constant pH in the negative electrode compartment 20 and the positive electrode compartment 22. Furthermore, by converting ferric ion to ferrous ion, the state of charge of the positive electrolyte in the positive electrode compartment 22 may be rebalanced with the state of charge of the negative electrolyte in the negative electrode compartment 20. Although equation (5) is written for rebalancing electrolytes in an IFB system, the method of reducing an electrolyte with hydrogen gas may be generalized by equation (6):

$$M^{x+} + \frac{(x-z)}{2}H_2 \to M^{z+}(x-z)H^+ \qquad (6)$$

In equation (6), M represents the positive electrolyte M having ionic charge, x, M$^{z+}$ represents the reduced electrolyte M having ionic charge, z.

A catalyst comprising graphite or comprising supported precious metal (e.g., carbon-supported Pt, Rd, Ru, or alloys thereof) catalyst may increase the rate of reaction described by equation (5) for practical utilization in a redox flow battery system. As an example, hydrogen gas generated in the redox flow battery system may be directed to a catalyst surface, and hydrogen gas and electrolyte (e.g., comprising ferric ion) may be fluidly contacted at the catalyst surface, wherein the hydrogen gas chemically reduces the ferric ion to ferrous ion and produces positive hydrogen ions (e.g., protons).

Figure 1:
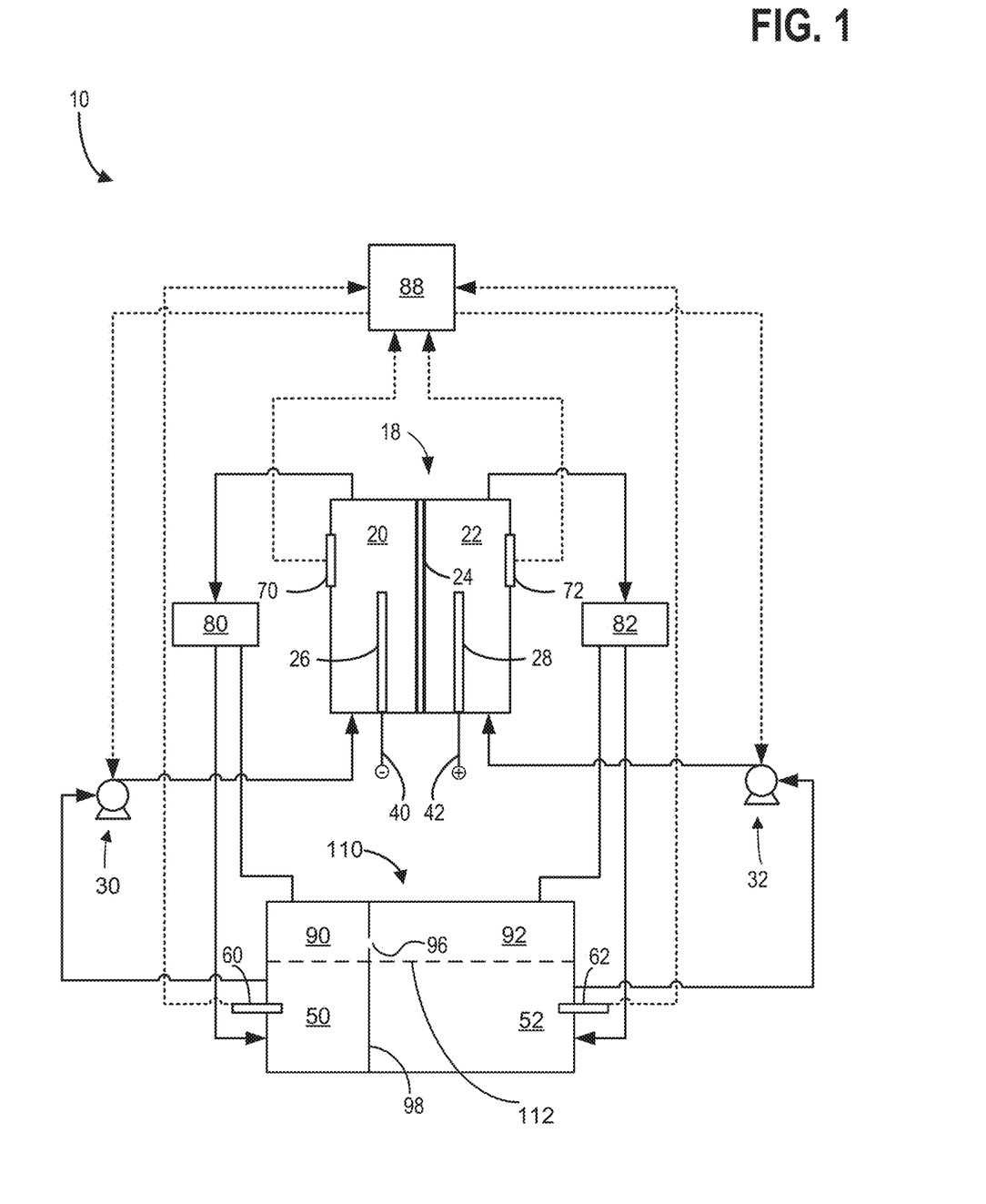
FIG. 1 shows a schematic representation of an example of a redox flow battery system having a multi-chamber electrolyte storage tank.
Figure 2:
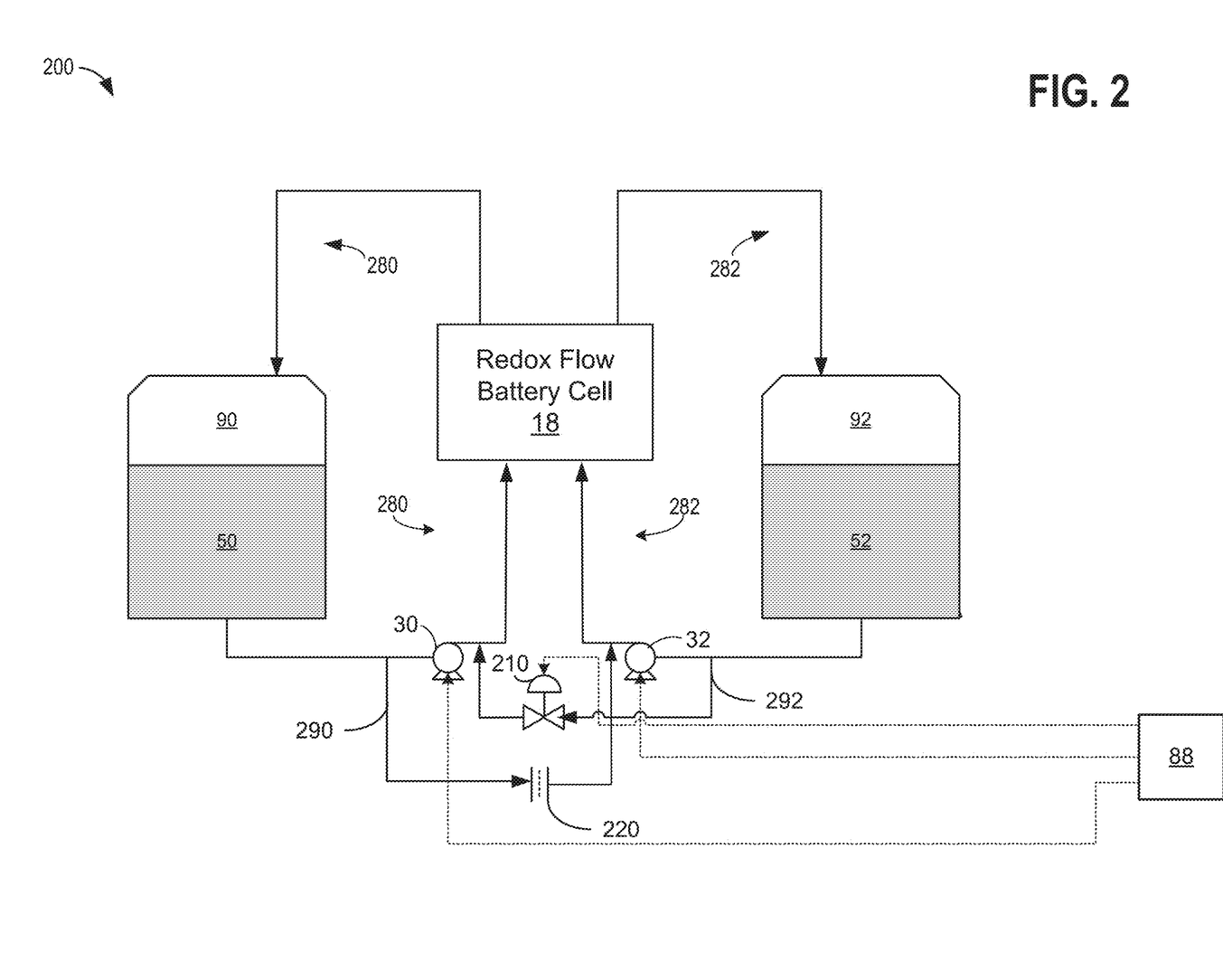
FIGS. 2 and 3 show example electrolyte flow circuit configurations of the redox flow battery system of FIG. 1 for performing a cleansing method for the redox flow battery system of FIG. 1.
Figure 3:
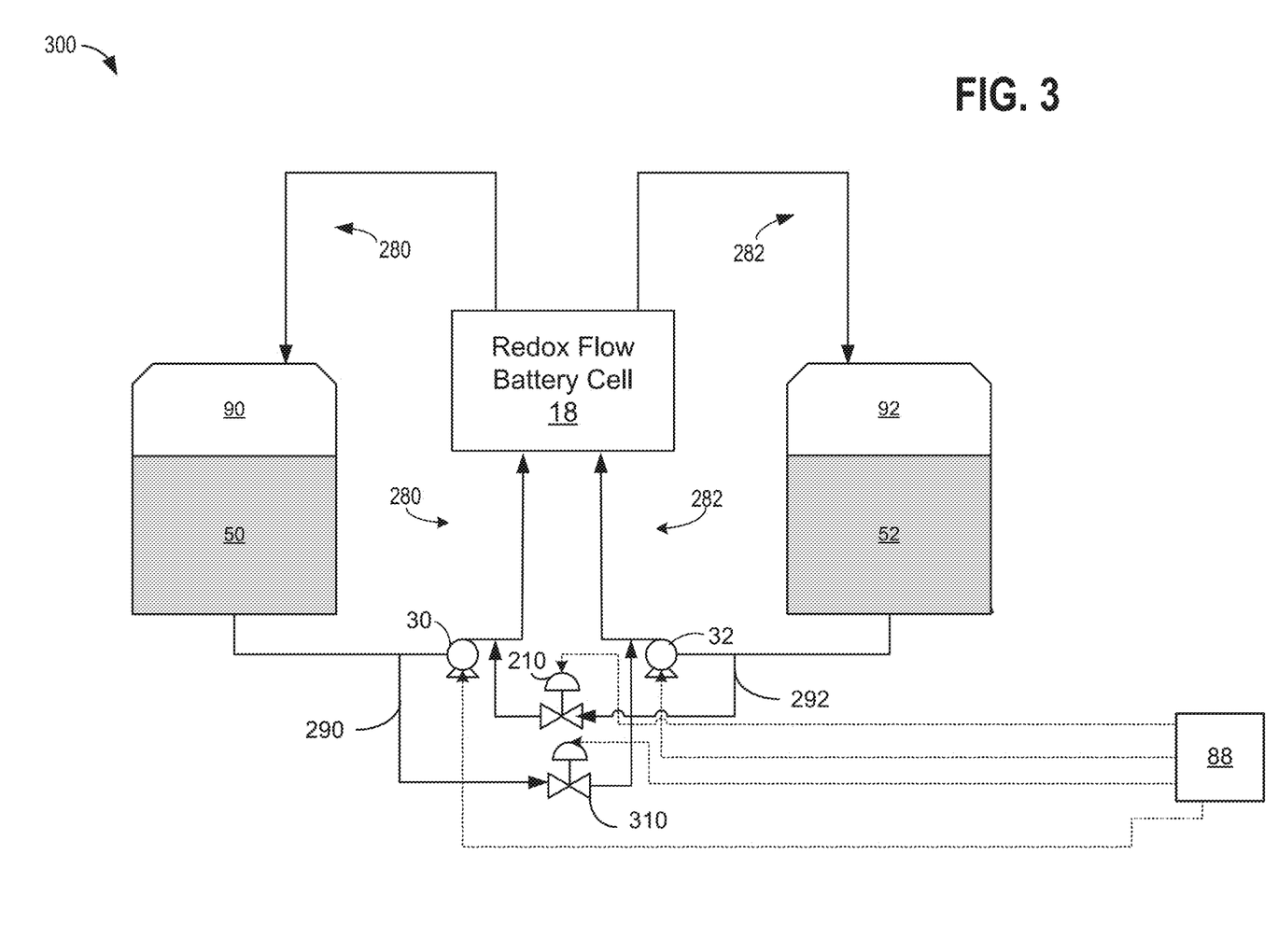
Figure 4:
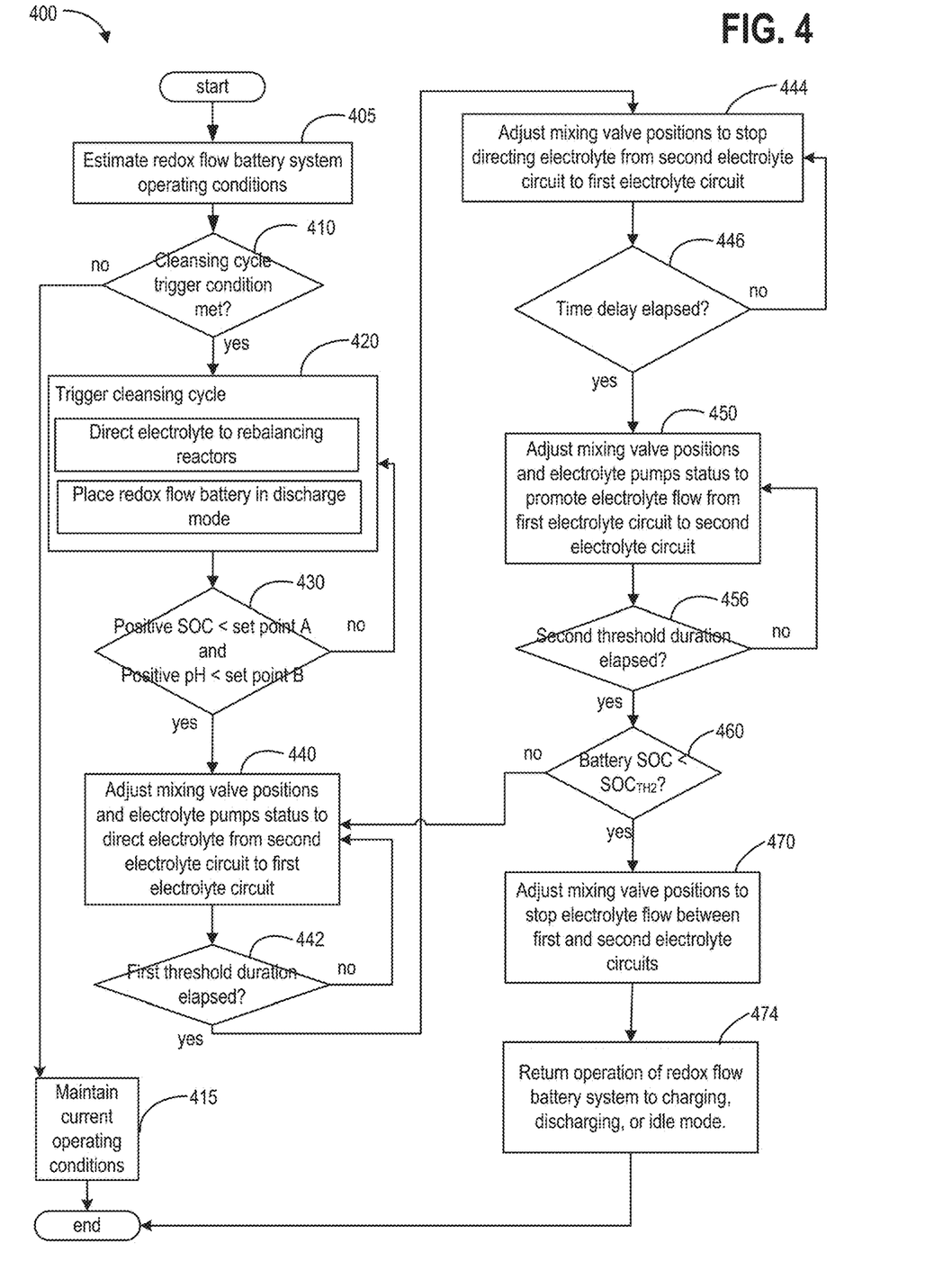
FIG. 4 shows an example flowchart for a method of operating the redox flow battery system of FIG. 1 in a cleansing mode.
Figure 5:
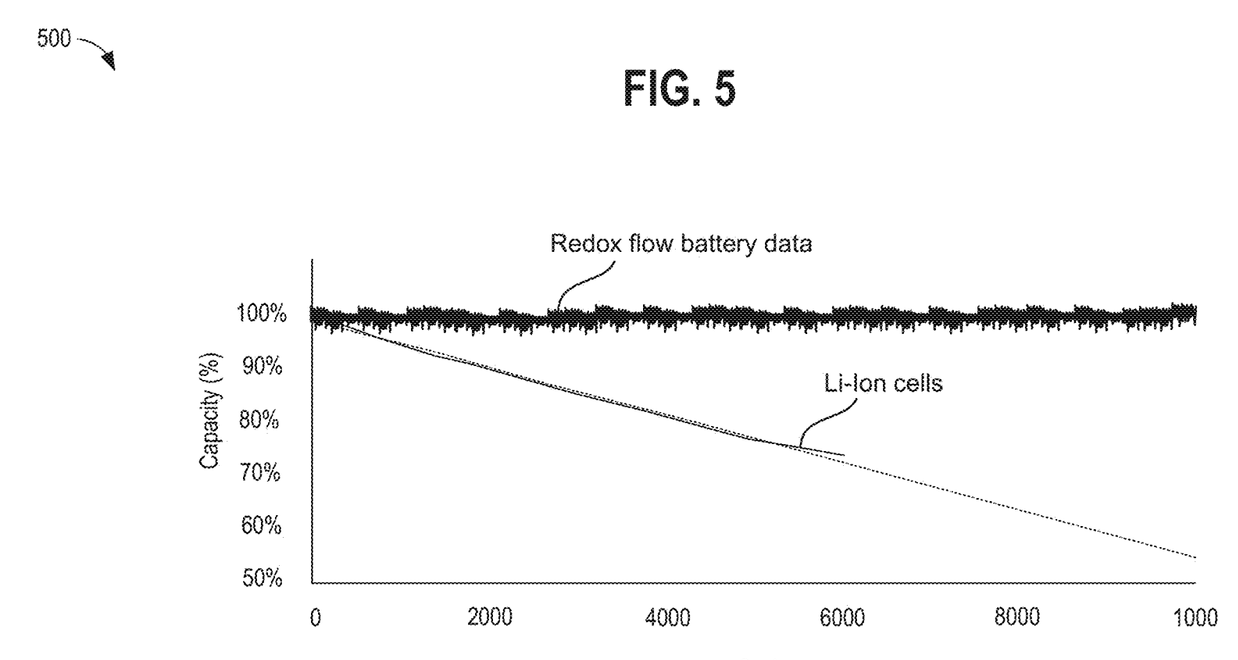
FIG. 5 shows a graph of percent battery capacity vs. number of cycles for the redox flow battery system of FIG. 1.

FIG. 1 is a schematic drawing of a redox flow battery system. FIGS. 2-3 illustrate various perspective views of electrolyte storage chambers, including the electrolyte storage chambers shown in FIG. 1 and that may be coupled to the redox flow battery system in FIG. 1. FIG. 4 illustrates a flow diagram of a cleansing method that may be coupled to and implemented in the operation of the redox flow battery system in FIG. 1. FIG. 5 illustrates a graph of percent battery capacity versus number of cycles, for both a redox iron flow battery as in FIG. 1 and a lithium ion battery.

FIG. 1 provides a schematic illustration of a redox flow battery system 10. The redox flow battery system 10 may comprise a redox flow battery cell 18, fluidly connected to a multi-chambered electrolyte storage tank 110. The redox flow battery cell 18 may generally include a negative electrode compartment 20, separator 24, and positive electrode compartment 22. The separator 24 may comprise an electrically insulating ionic conducting barrier which prevents bulk mixing of the positive electrolyte and the negative electrolyte while allowing conductance of specific ions therethrough. For example, the separator 24 may comprise an ion-exchange membrane and/or a microporous membrane. The negative electrode compartment 20 may comprise a negative electrode 26, and a negative electrolyte comprising electroactive materials. The positive electrode compartment 22 may comprise a positive electrode 28, and a positive electrolyte comprising electroactive materials. In some examples, multiple redox flow battery cells 18 may be combined in series or parallel to generate a higher voltage or current in a redox flow battery system. Further illustrated in FIG. 1 are negative and positive electrolyte pumps 30 and 32, both used to pump electrolyte solution through the flow battery system 10. Electrolytes are stored in one or more tanks external to the cell, and are pumped via negative and positive electrolyte pumps 30 and 32 through the negative electrode compartment 20 side and the positive electrode compartment 22 side of the battery, respectively.

As illustrated in FIG. 1, the redox flow battery cell 18 may further include negative battery terminal 40, and positive battery terminal 42. When a charge current is applied to the battery terminals 40 and 42, the positive electrolyte is oxidized (lose one or more electrons) at the positive electrode 28, and the negative electrolyte is reduced (gain one or more electrons) at the negative electrode 26. During battery discharge, reverse redox reactions occur on the electrodes. In other words, the positive electrolyte is reduced (gain one or more electrons) at the positive electrode 28, and the negative electrolyte is oxidized (lose one or more electrons) at the negative electrode 26. The electrical potential difference across the battery is maintained by the electrochemical redox reactions in the positive electrode compartment 22 and the negative electrode compartment 20, and can induce a current through a conductor while the reactions are sustained. The amount of energy stored by a redox battery is limited by the amount of electro-active material available in electrolytes for discharge, depending on the total volume of electrolytes and the solubility of the electro-active materials.

The flow battery system 10 may further comprise an integrated multi-chambered electrolyte storage tank 110. The multi-chambered storage tank 110 may be divided by a bulkhead 98. The bulkhead 98 may create multiple chambers within the storage tank so that both the positive and negative electrolyte may be included within a single tank. The negative electrolyte chamber 50 holds negative electrolyte comprising electroactive materials, and the positive electrolyte chamber 52 holds positive electrolyte comprising electroactive materials. The bulkhead 98 may be positioned within the multi-chambered storage tank 110 to yield a desired volume ratio between the negative electrolyte chamber 50 and the positive electrolyte chamber 52. In one example, the bulkhead 98 may be positioned to set the volume ratio of the negative and positive electrolyte chambers according to the stoichiometric ratio between the negative and positive redox reactions. The figure further illustrates the fill height 112 of storage tank 110, which may indicate the liquid level in each tank compartment. The figure also shows gas head space 90 located above the fill height 112 of negative electrolyte chamber 50, and gas head space 92 located above the fill height 112 of positive electrolyte chamber 52. The gas head space 92 may be utilized to store hydrogen gas generated through operation of the redox flow battery (e.g., due to proton reduction and corrosion side reactions) and conveyed to the multi-chambered storage tank 110 with returning electrolyte from the redox flow battery cell 18. The hydrogen gas may be separated spontaneously at the gas-liquid interface (e.g., fill height 112) within the multi-chambered storage tank 110, thereby precluding having additional gas-liquid separators as part of the redox flow battery system. Once separated from the electrolyte, the hydrogen gas may fill the gas head spaces 90 and 92. A such, the stored hydrogen gas can aid in purging other gases from the multi-chambered electrolyte storage tank 110, thereby acting as an inert gas blanket for reducing oxidation of electrolyte species, which can help to reduce redox flow battery capacity losses. In this way, utilizing the integrated multi-chambered storage tank 110 may forego having separate negative and positive electrolyte storage tanks, hydrogen storage tanks, and gas-liquid separators common to conventional redox flow battery systems, thereby simplifying the system design, reducing the physical footprint of the system, and reducing system costs.

FIG. 1 also shows the spill over-hole 96, which creates an opening in the bulkhead 98 between gas head spaces 90 and 92, and provides a means of equalizing gas pressure between the two chambers. The spill over hole 96 may be positioned at a threshold height above the fill height 112. The spill over hole further enables a capability to self-balance the electrolytes in each of the positive and negative electrolyte chambers in the event of a battery crossover. In the case of an all iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but the overall electrolyte composition, battery module performance, and battery module capacity are maintained. Flange fittings may be utilized for all piping connections for inlets and outlets to and from the multi-chambered storage tank 110 to maintain a continuously pressurized state without leaks. The multi-chambered storage tank can include at least one outlet from each of the negative and positive electrolyte chambers, and at least one inlet to each of the negative and positive electrolyte chambers. Furthermore, one or more outlet connections may be provided from the gas head spaces 90 and 92 for directing hydrogen gas to rebalancing reactors 80 and 82.

Although not shown in FIG. 1, integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers may include one or more heaters. In the case where only the positive electrolyte chamber includes one or more heaters, the negative electrolyte may be heated by transferring heat generated at the battery cells of the power module to the negative electrolyte. In this way, the battery cells of the power module may heat and facilitate temperature regulation of the negative electrolyte. The one or more heaters may be actuated by the controller 88 to regulate a temperature of the negative electrolyte chamber 50 and the positive electrolyte chamber independently or together. For example, in response to an electrolyte temperature decreasing below a threshold temperature, the controller may increase a power supplied to one or more heaters so that a heat flux to the electrolyte is increased. The electrolyte temperature may be indicated by one or more temperature sensors mounted at the multi-chambered electrolyte storage tank 110, including sensors 60 and 62. As examples the one or more heaters may include coil type heaters or other immersion heaters immersed in the electrolyte fluid, or surface mantle type heaters that transfer heat conductively through the walls of the negative and positive electrolyte chambers to heat the fluid therein. Other known types of tank heaters may be employed without departing from the scope of the present disclosure. Furthermore, controller 88 may deactivate one or more heaters in the negative and positive electrolyte chambers in response to a liquid level decreasing below a solids fill threshold level. Said in another way, controller 88 may activate the one or more heaters in the negative and positive electrolyte chambers only in response to a liquid level increasing above the solids fill threshold level. In this way, activating the one or more heaters without sufficient liquid in the positive and/or negative electrolyte chambers can be averted, thereby reducing a risk of overheating or burning out the heaters.

Further illustrated in FIG. 1, electrolyte solutions typically stored in the multi-chambered storage tank 110 are pumped via negative and positive electrolyte pumps 30 and 32 throughout the flow battery system 10. Electrolyte stored in negative electrolyte chamber 50 is pumped via negative electrolyte pump 30 through the negative electrode compartment 20 side, and electrolyte stored in positive electrolyte chamber 52 is pumped via positive electrolyte pump 32 through the positive electrode compartment 22 side of the battery.

Two electrolyte rebalancing reactors 80 and 82, may be connected in-line or in parallel with the recirculating flow paths of the electrolyte at the negative and positive sides of the battery, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in the return flow path from the positive and negative electrode compartments 20 and 22 to the positive and negative electrolyte chambers 50 and 52, respectively. Electrolyte rebalancing reactors 80 and 82 may serve to rebalance electrolyte charge imbalances in the redox flow battery system occurring due to side reactions, ion crossover, and the like, as described herein. In one example, electrolyte rebalancing reactors 80 and 82 may include trickle bed reactors, where the hydrogen gas and electrolyte are contacted at catalyst surfaces in a packed bed for carrying out the electrolyte rebalancing reaction. In other examples the rebalancing reactors 80 and 82 may include flow-through type reactors that are capable of contacting the hydrogen gas and the electrolyte liquid and carrying out the rebalancing reactions in the absence of a packed catalyst bed.

During operation of a redox flow battery system, sensors and probes may monitor and control chemical properties of the electrolyte such as electrolyte pH, concentration, state of charge, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. In one example, sensors 70 and 72 may include pressure sensors that transmit signals to the controller 88 indicating the pressure at the negative and positive sides of the separator 24 of the redox flow battery cell 18. The pressure at the negative and positive electrode compartments 20 and 22 of the separator 24 may be regulated by controlling the inlet and outlet flows of negative and positive electrolyte thereto, respectively. For example, the controller may decrease a pressure at the negative electrode compartment 20 by one or more of increasing a pump speed of a vacuum pump fluidly coupled to thereto, reducing a pump speed of the negative electrolyte pump 30, and by throttling a back pressure flow regulator to increase an outlet flow from the negative electrode compartment.

Similarly, the controller may increase a pressure at the positive electrode compartment 22 by one or more of increasing a pump speed of the positive electrolyte pump 32, and by throttling a back pressure flow regulator to decrease an outlet flow from the negative electrode compartment. Back pressure flow regulators may include orifices, valves, and the like. For example, controller 88 may send a signal to position a valve to a more open position, to induce higher outlet flows from negative electrode compartment 20, thereby reducing a negative electrode compartment pressure. Increasing the positive electrode compartment pressure and decreasing the pressure in the negative electrode compartment may aid in increasing a cross-over pressure (positive over negative) across the separator 24. Increasing the cross-over pressure by increasing the flow of the positive electrolyte by increasing the pump speed of the positive electrolyte pump 32 and increasing back pressure at the outlet of the positive electrode compartment 22 may be less desirable than other methods of increasing the cross-over pressure because pump parasitic losses may be increased.

Sensors may be positioned at other locations throughout the redox flow battery system to monitor electrolyte chemical properties and other properties. For example a sensor may be positioned in an external acid tank (not shown) to monitor acid volume or pH of the external acid tank, wherein acid from the external acid tank is supplied via an external pump (not shown) to the redox flow battery system in order to reduce precipitate formation in the electrolytes. Additional external tanks and sensors may be installed for supplying other additives to the redox flow battery system 10. For example, various sensor including, temperature, pressure, conductivity, and level sensors of a field hydration system may transmit signals to the controller 88 when hydrating a redox flow battery system in a dry state. Furthermore, controller 88 may send signals to actuators such as valves and pumps of the field hydration system during hydration of the redox flow battery system. Sensor information may be transmitted to a controller 88 which may in turn actuate negative and positive electrolyte pumps 30 and 32 to control electrolyte flow through the cell 18, or to perform other control functions, as an example. In this manner, the controller 88 may be responsive to, one or a combination of sensors and probes. Redox flow battery cell 18 may be positioned within one of a plurality of redox flow battery cell stacks of a power module for a redox flow battery system. Each of the redox flow battery cells 18 in a redox flow battery cell stack may be electrically connected in series and/or parallel with a plurality of other redox flow battery cells in the redox flow battery cell stack. Furthermore each of the redox flow battery cell stacks may be electrically connected in series and/or parallel with a plurality of the other redox flow battery cell stacks in the power module. In this way, the redox flow battery cell stacks may be electrically combined to supply power from the power module.

Redox flow battery system 10 may further comprise a source of hydrogen gas. In one example the source of hydrogen gas may comprise a separate dedicated hydrogen gas storage tank. In the example of FIG. 1, hydrogen gas may be stored in and supplied from the integrated multi-chambered electrolyte storage tank 110. Integrated multi-chambered electrolyte storage tank 110 may supply additional hydrogen gas to the positive electrolyte chamber 52 and the negative electrolyte chamber 50. Integrated multi-chambered electrolyte storage tank 110 may alternately supply additional hydrogen gas to the inlet of electrolyte rebalancing reactors 80 and 82. As an example, a mass flow meter or other flow controlling device (which may be controlled by controller 88) may regulate the flow of the hydrogen gas from integrated multi-chambered electrolyte storage tank 110.

The integrated multi-chambered electrolyte storage tank 110 may supplement the hydrogen gas generated in redox flow battery system 10. For example, when gas leaks are detected in redox flow battery system 10 or when the reduction reaction rate is too low at low hydrogen partial pressure, hydrogen gas may be supplied from the integrated multi-chambered electrolyte storage tank 110 in order to rebalance the state of charge of the electro-active species in the positive electrolyte and negative electrolyte. As an example, controller 88 may supply hydrogen gas from integrated multi-chambered electrolyte storage tank 110 in response to a measured change in pH or in response to a measured change in state of charge of an electrolyte or an electro-active species. For example an increase in pH of the negative electrolyte chamber 50, or the negative electrode compartment 20, may indicate that hydrogen is leaking from the redox flow battery system 10 and/or that the reaction rate is too slow with the available hydrogen partial pressure. In response to the pH increase, controller 88 may increase a supply of hydrogen gas from integrated multi-chambered electrolyte storage tank 110 to the redox flow battery system 10. As a further example, controller 88 may supply hydrogen gas from integrated multi-chambered electrolyte storage tank 110 in response to a pH change, wherein the pH increases beyond a first threshold pH or decreases beyond a second threshold pH. In the case of an IFB, controller 88 may supply additional hydrogen to increase the rate of reduction of ferric ions and the rate of production of protons, thereby reducing the pH of the positive electrolyte. Furthermore, the negative electrolyte pH may be lowered by hydrogen reduction of ferric ions crossing over from the positive electrolyte to the negative electrolyte or by proton generated at the positive side crossing over to the negative electrolyte due to a proton concentration gradient and electrophoretic forces. In this manner, the pH of the negative electrolyte may be maintained within a stable region, while reducing the risk of precipitation of ferric ions (crossing over from the positive electrode compartment) as Fe(OH)3.

Other control schemes for controlling the supply rate of hydrogen gas from integrated multi-chambered electrolyte storage tank 110 responsive to a change in an electrolyte pH or to a change in an electrolyte state of charge, detected by other sensors such as an oxygen-reduction potential (ORP) meter or an optical sensor, may be implemented. Further still, the change in pH or state of charge triggering the action of controller 88 may be based on a rate of change or a change measured over a time period. The time period for the rate of change may be predetermined or adjusted based on the time constants for the redox flow battery system. For example the time period may be reduced if the recirculation rate is high, and local changes in concentration (e.g., due to side reactions or gas leaks) may quickly be measured since the time constants may be small.

FIGS. 2 and 3 present example electrolyte flow circuit configurations, 200 and 300 respectively, by which electrolyte storage chambers may be fluidly connected for operation of the cleansing method disclosed herein for cleansing the redox flow battery system of FIG. 1. The redox flow battery system 10 may include one of the electrolyte flow circuit configurations 200 and 300. In FIG. 2, positive electrolyte chamber 52 and negative electrolyte chamber 50 may be coupled with a first mixing valve 210 and an orifice 220. More specifically, an inlet to the first mixing valve 210 may be fluidly coupled within a fluid passage 292 positioned to divert electrolyte from the second electrolyte circuit 282 at a discharge from the positive electrolyte chamber 52 upstream of the positive electrolyte pump 32; the outlet of the first mixing valve 210 may be fluidly coupled to the first electrolyte circuit 280 downstream of the negative electrolyte pump 30. Furthermore, an inlet to the orifice 220 may be fluidly coupled within a fluid passage 290 positioned to divert electrolyte from the first electrolyte circuit 280 at a discharge from the negative electrolyte chamber 50 upstream of the negative electrolyte pump 30; the outlet of the orifice 220 may be fluidly coupled to the second electrolyte circuit 282 downstream of the positive electrolyte pump 32.

In FIG. 3, a flow circuit configuration 300 includes positive electrolyte chamber 52 and negative electrolyte chamber 50, which are fluidly connected with first and second motor-controlled mixing valves 210 and 310, respectively. As in the flow circuit configuration 200 of FIG. 2, an inlet to the first mixing valve 210 may be fluidly coupled within a fluid passage 292 positioned to divert electrolyte from the second electrolyte circuit 282 at a discharge from the positive electrolyte chamber 52 upstream of the positive electrolyte pump 32; the outlet of the first mixing valve 210 may be fluidly coupled to the first electrolyte circuit 280 downstream of the negative electrolyte pump 30. Furthermore, an inlet to the mixing valve 310 may be fluidly coupled within a fluid passage 290 positioned to divert electrolyte from the first electrolyte circuit 280 at a discharge from the negative electrolyte chamber 50 upstream of the negative electrolyte pump 30; the outlet of the mixing valve 310 may be fluidly coupled to the second electrolyte circuit 282 downstream of the positive electrolyte pump 32.

In both FIGS. 2 and 3, the motor-controlled mixing valves 210 and 310 may be actuated by a controller, such as controller 88 of the redox flow battery system, and the positive and negative electrolyte chambers 52 and 50 are further fluidly connected to the redox flow battery cell 18. The flow configurations illustrated in FIGS. 2 and 3 may be generalized and applied to multiple tank or multi-chamber single tank electrolyte storage configurations. For example, positive electrolyte chamber 52 and negative electrolyte chamber 50 may correspond to the positive electrolyte chamber 52 and negative electrolyte chamber 50 of the multi-chamber electrolyte storage tank 110 of FIG. 1.

The negative electrolyte chamber 50, head space 90, and redox flow battery cell 18 including a negative electrode compartment 20, are arranged along a first electrolyte circuit 280. Furthermore, although not shown in FIG. 2, a first rebalancing reactor (e.g., rebalancing reactor 80 of FIG. 1) may also be arranged in series along the first electrolyte circuit 280 or in parallel thereto. During battery discharge, charge, and idle modes, negative electrolytes from the negative electrolyte chamber 50 may flow through the first electrolyte circuit 280 with assistance from the negative electrolyte pump 30. Thus, when the negative electrolyte pump 30 is active (e.g., ON), negative electrolytes flow through the first electrolyte circuit 280.

The positive electrolyte chamber 52, head space 92, and redox flow battery cell 18 including positive electrode compartment 22, are arranged along a second electrolyte circuit 282. Furthermore, a second rebalancing reactor (e.g., rebalancing reactor 82 of FIG. 1) may also be arranged in series along the second electrolyte circuit 282 or in parallel thereto. During battery discharge, charge, and idle modes, positive electrolytes from the positive electrolyte chamber 52 may flow through the second electrolyte circuit 282 with assistance from the positive electrolyte pump 32. Thus, when the positive electrolyte pump 32 is active (e.g., ON), positive electrolytes flow through the second electrolyte circuit 282.

The first 280 and second 282 electrolyte circuits are fluidly separated from one another outside of during a cleansing mode of operation of the redox flow battery system. In this way, negative electrolytes from the negative electrolyte chamber 50 in the first electrolyte circuit 280 do not mix with positive electrolyte from the positive electrolyte chamber 52 in the second electrolyte circuit 282 outside of the cleansing mode during charge, discharge, and idle modes.

The cleansing mode may be activated in response to one or more of a system available capacity being lower than a threshold capacity at a given battery state of charge (SOC) and battery charge/discharge performance being lower than a threshold performance at a given battery SOC. The battery charge/discharge performance can include a charge/discharge current and/or charge/discharge voltage, respectively. Similarly, the threshold performance may refer to a threshold charge current, a threshold discharge current, a threshold charge voltage, a threshold charge current, or a combination thereof. In other words, a battery charge performance may be lower than a threshold charge performance at a given battery SOC when the battery charge voltage is lower than a threshold charge voltage and/or when the battery charge current is less than a threshold charge current. This may occur when an electrolytic imbalance occurs between the negative and positive electrolyte chambers 50 and 52. The first electrolyte circuit 280 and the second electrolyte circuit 282 may be fluidly coupled during the cleansing mode. As such, electrolytes from the positive electrolyte chamber 52 may flow into the first electrolyte circuit 280 and electrolytes from the negative electrolyte chamber may flow into the second electrolyte circuit 282.

In the embodiment of FIG. 2, the first 280 and second 282 electrolyte circuits may be fluidly coupled via one or more of the first mixing valve 210 and the orifice 220. The first mixing valve 210 may allow electrolytes from the positive electrolyte chamber 52 of the second electrolyte circuit 282 to flow into the first electrolyte circuit 280. In one example, electrolytes from the negative electrolyte chamber 50 do not flow from the first electrolyte circuit 280 to the second electrolyte circuit 282 via the first mixing valve 210.

The orifice 220 may allow electrolytes from the negative electrolyte chamber 50 of the first electrolyte circuit 280 to flow into the second electrolyte circuit 282. In one example, electrolytes from the positive electrolyte chamber 52 do not flow from the second electrolyte circuit 282 to the first electrolyte circuit 280 via the orifice 220.

The orifice 220 may be sized to adjust a flow rate from the first electrolyte circuit 280 to the second electrolyte circuit 282. The orifice 220 may be sized based on a flow rate of the negative electrolyte pump 30. In one example, the orifice 220 is sized to provide a flow rate between the first 280 and second 282 electrolyte circuits substantially equal to a flow rate of the negative electrolyte pump 30. In one example, a mixing rate between the first 280 and second 282 electrolyte circuits increases as a size of the orifice 220 increases.

In some embodiments, additionally or alternatively, the orifice 220 fluidly couples the first 280 and second 282 electrolyte circuits outside of the cleansing mode. As such, electrolyte flow between the first 280 and second 282 electrolyte circuits may be based on a pressure difference between the circuits. For example, if a pressure of the first electrolyte circuit 280 is greater than a pressure of the second electrolyte circuit 282, then the orifice 220 may permit electrolytes to flow from the first circuit 280 to the second circuit 282.

When one or more of the system available capacity is lower than the threshold capacity at a given battery state of charge (SOC) and/or the battery charge/discharge performance is lower than a threshold performance at a given battery SOC, the cleansing mode and the discharge mode are initiated. As shown above in equations 1 and 2, compositions of the negative and positive electrolyte chambers 50 and 52 are substantially similar during the discharge mode. As such, system controller 88 may initiate start of the cleansing cycle, which entails discharging the battery system beyond a threshold discharge SOC, including positive and negative electrolyte flowing through the rebalancing reactors 80 and 82 to reduce charge imbalances between the positive and negative sides of the battery. For example, when the positive electrolyte pH is less than a threshold discharge pH and positive electrolyte SOC is lower than a threshold discharge SOC, then the start of the cleansing cycle may be triggered. The threshold discharge pH may be selected to reduce a risk of $Fe(OH)_3$ precipitation resulting from mixing the positive electrolyte (having a lower pH) and negative electrolyte (having a higher pH). The threshold discharge SOC may be selected to reduce an amount of Ferric ion being introduced into the negative electrolyte.

During the cleansing mode, electrolyte may initially flow from the second electrolyte circuit 282 to the first electrolyte circuit 280. This may include opening the first mixing valve 210 and activating the negative electrolyte pump 30 to draw electrolyte from the second electrolyte circuit 282 to the first electrolyte circuit 280. Furthermore, the positive electrolyte pump 32 may be deactivated. As such, electrolytes may not be circulated by the positive electrolyte pump 32 through the second electrolyte circuit 282. In this way, electrolytes from the second electrolyte circuit 282 mix with electrolytes in the first electrolyte circuit 280 when the first mixing valve 210 is open and the negative electrolyte pump 30 is activated. Conversely, while the positive electrolyte pump 32 is deactivated, circulating electrolytes in the first electrolyte circuit 280 may not flow to the second electrolyte circuit 282. By utilizing the negative electrolyte pump 30 to circulate electrolytes through the first electrolyte circuit 280 during the cleansing cycle, an additional pump to the negative electrolyte pump 30 and the positive electrolyte pump 32 for cleansing the electrolyte chambers may not be included in the redox flow battery system (e.g., redox flow battery system 10 of FIG. 1). As such, packaging restraints and manufacturing costs are reduced compared to systems having additional pumps other than the negative electrolyte pump 30 and the positive electrolyte pump 32, which are already utilized to circulate electrolyte during charging and discharging of the redox flow battery system 10.

Electrolytes from the second electrolyte circuit 282 may flow to the first electrolyte circuit 280 for a first threshold duration. The first threshold duration may be fixed. Alternatively, the first threshold duration may be adjusted based on a difference between the battery SOC and the threshold SOC. In one example, the first threshold duration increases as the difference between the battery SOC and the threshold SOC increases and as a result, a greater amount of electrolytes from the second electrolyte circuit 282 flow to the first electrolyte circuit 280.

Responsive to the first threshold duration elapsing, the first mixing valve 210 is closed, while the negative electrolyte pump 30 remains active. As such, electrolytes from both the first 280 and second 282 electrolyte circuits continue to flow through the first electrolyte circuit 280 without flowing to the second electrolyte circuit 282. This may occur for a time delay. In one example, the time delay is fixed. Alternatively, the time delay may be proportionally related to the first threshold duration, wherein as the first threshold duration increases, the time delay increases. In this way, electrolytes flow through only the first electrolyte circuit 280 during the time delay. Flowing electrolytes through only the first electrolyte circuit 280 during the time delay aids in more thorough mixing of the electrolytes in the first electrolyte circuit 280 during the time delay when no further electrolyte flows from the second electrolyte circuit 282 into the first electrolyte circuit 280.

Responsive to elapsing of the time delay, the negative electrolyte pump 30 is deactivated, and the positive electrolyte pump 32 is activated, thereby promoting flow of electrolytes from the first electrolyte circuit 280 to the second electrolyte circuit 282 by way of the orifice 220. Electrolytes may flow from the first electrolyte circuit 280 to the second electrolyte circuit 282 for a second threshold duration. In one example, the second threshold duration is exactly equal to the first threshold duration. Alternatively, the second threshold duration may be based on a combination of a sizing of the orifice and the first threshold duration. At any rate, the second threshold duration may be an amount of time desired to allow electrolytes to flow from the first electrolyte circuit 280 to the second electrolyte circuit 282 to balance an electrolyte volume in both of the first and second electrolyte circuits 280 and 282.

Additionally or alternatively, the cleansing cycle may be activated and electrolytes may flow from the first electrolyte circuit 280 to the second electrolyte circuit only when a battery SOC is less than the threshold discharge SOC. In response to the battery SOC being greater than the threshold discharge SOC, the cleansing mode may be deactivated and the battery system may return to operating in the charge, discharge, or idle mode. In one example, deactivating the cleansing mode includes closing the first mixing valve 210 and preventing flow of electrolytes between the first 280 and second 282 electrolyte circuits.

In the embodiment of FIG. 3, the first and second mixing valves 210 and 310, respectively, may be electrically, hydraulically, and/or pneumatically powered, and electrically coupled to the controller 88. The positive and negative electrolyte chambers 52 and 50 may enter a cleansing mode in response to a state of charge (SOC) of the redox flow battery cell 18 falling below a threshold SOC and an electrolyte pH falling below a threshold pH. For example, when the positive electrolyte pH is less than a threshold discharge pH and positive electrolyte SOC is lower than a threshold discharge SOC, then the start of the cleansing cycle may be triggered. The threshold discharge pH may be selected to reduce a risk of $Fe(OH)_3$ precipitation resulting from mixing the positive electrolyte (having a lower pH) and negative electrolyte (having a higher pH). The threshold discharge SOC may be selected to reduce an amount of Ferric ion being introduced into the negative electrolyte.

The second mixing valve 310 is arranged in a location of the battery system similar to a location of the orifice 220 of FIG. 2. The second mixing valve 310 may be positioned to prevent first 280 and second 282 electrolyte circuits from mixing during operation outside of the cleansing mode. In this way, the configuration of FIG. 3, including first and second mixing valves 210 and 310, may be advantageous over the configuration of FIG. 2, including first mixing valve 210 and orifice 220. However, the configuration of FIG. 2 may be less costly and simpler to implement.

For example, when the first mixing valve 210 is open and the negative electrolyte pump 30 is activated to promote the flow of electrolytes from the second electrolyte circuit 282 to the first electrolyte circuit 280, the second mixing valve 310 is moved to a closed position. In this way, the positive electrolyte pump 32 may be activated while electrolyte flow from the second circuit 282 to the first circuit 280. In this way, a portion of electrolytes in the second circuit 282 may remain and circulate through the second circuit 282, while a remaining portion are directed to the first electrolyte circuit 280.

As a further example, additionally or alternatively, during the time delay following the first threshold duration, the second mixing valve 310 and the first mixing valve 210 are moved to closed positions, thereby fluidly isolating the first 280 and second 282 electrolyte circuits from one another. However, by arranging the second mixing valve 310 in the location of the orifice 220 of FIG. 2, the positive electrolyte pump 32 may be active during the time delay.

As another example, additionally or alternatively, following the time delay where the negative electrolyte pump 30 is deactivated and the electrolytes are directed to flow from the first electrolyte circuit 280 to the second electrolyte circuit 282, the second mixing valve 310 is moved to an open position and the first mixing valve 210 is moved to a closed position. By moving the second mixing valve 310 to the open position while the positive electrolyte pump is activated, electrolytes may flow from the first electrolyte circuit 280 to the second electrolyte circuit 282. Electrolytes do not flow from the second electrolyte circuit 282 to the first electrolyte circuit 280 via the second mixing valve 310.

Thus, the FIGS. 2 and 3 show embodiments for flow battery systems that utilize the same chemical components in positive and negative electrolytes, for example $Fe^{2+}$, salt, and water for an IFB system, further comprising a process to operate these redox flow battery systems in a cleansing mode, which allows for their operation for an increased number of charge and discharge cycles without overall capacity fade as compared to conventional redox flow battery systems.

Two electrolyte tanks of a redox flow battery system, such as negative and positive electrolyte chambers 50 and 52 are connected either with one motor controlled mixing valve (e.g., first mixing valve 210) and one control orifice (e.g., orifice 220) or with two motor controlled mixing valves (e.g., first mixing valve 210 and second mixing valve 310).

When operating the IFB redox flow battery system, battery capacity can be tracked by monitoring system charge/discharge current and voltage at a given electrolyte SOC. When it is detected that IFB battery capacity is less than a first threshold SOC, for example 90% of a full SOC, a cleansing cycle may be triggered.

During operation of the cleansing cycle, the redox flow battery system may be automatically placed in discharge mode while rebalancing systems are on to rapidly reduce all electrolytes' state of charge. Responsive to a positive electrolyte state of charge being lower than a threshold discharge SOC and a positive electrolyte pH being lower than the threshold discharge pH, the first mixing valve 210 is opened to push positive electrolyte to the negative side (e.g., first electrolyte circuit 280). Furthermore, in one example, pump 32 may be deactivated to aid in pushing positive electrolyte to the negative side (e.g., first electrolyte circuit 280).

In response to the first mixing valve 210 being open for a first threshold duration, the first control valve is closed and then mixed electrolyte in the first electrolyte circuit 280 is directed back to positive electrolyte chamber 52 in the second electrolyte circuit 282 by way of an orifice 220 or by opening a second mixing valve 310. The above cleansing cycle process may be repeated until a battery state of charge is lower than a threshold battery SOC, for example 2% of full SOC, after which the redox flow battery system 10 may be ready for operation in charging/discharging mode.

FIG. 4 illustrates an example method 400 for cleansing electrolyte in a redox flow battery system such as the redox flow battery system 10 of FIG. 1. Instructions for carrying out method 400 (e.g., operating the redox flow battery system in the cleansing mode) and the rest of the methods included herein may be executed by a controller (e.g., controller 88) based on instructions stored on a non-transitory memory of the controller and in conjunction with signals received from sensors of the redox flow battery system 10 such as the sensors described above with reference to FIG. 1. The controller may employ actuators of the redox flow battery system to adjust operation thereof, according to the methods described below.

Method 400 begins at 405, where the operating conditions of the redox flow battery system may be determined. As an example, at 405, electrolyte chemical properties including system charge/discharge mode status, current, voltage, pH, conductivity, and the like, at a given electrolyte state of charge and the like may be measured using various sensors and/or probes (e.g., sensors 60, 62, 70, 72). At 410, the method 400 may include the controller determining if a cleansing cycle triggering condition is met. As one example, the cleansing cycle triggering condition may be met when the redox flow battery capacity is less than a threshold target battery capacity (e.g., threshold SOC). As an example, the battery state of charge may be determined by optical scanner, and electrolyte concentration may be monitored using an ORP probe for measuring electrolyte potential. In one example, the threshold target battery capacity may include 90% of the redox flow battery capacity. In another example, the threshold target battery capacity may include 97% of the redox flow battery capacity.

Furthermore, the cleansing cycle triggering condition may include when the positive electrolyte pH is less than a threshold discharge pH and/or the positive electrolyte SOC is lower than a threshold discharge SOC. As described above, the threshold discharge pH may be selected to reduce a risk of $Fe(OH)_3$ precipitation resulting from mixing the positive electrolyte (having a lower pH) and negative electrolyte (having a higher pH). The threshold discharge SOC may be selected to reduce an amount of Ferric ion being introduced into the negative electrolyte. During discharge of the redox flow battery, ferric ion is reduced to ferrous ion (equation (2)), so triggering the cleansing cycle below the threshold discharge SOC may aid in substantially reducing the concentration of ferric ion in the positive electrolyte, thereby substantially reducing a risk of $Fe(OH)_3$ precipitation. In one example, when the positive electrolyte SOC is below the threshold discharge SOC, the positive electrolyte is essentially free of ferric ion. In one example, the threshold discharge pH may include a pH of 1. In another example, the cleansing cycle triggering condition may be met only when a battery SOC is less than the threshold discharge SOC.

If the cleansing cycle trigger condition is not met, then the method 400 proceeds to 415 where the controller may maintain current battery operating conditions and the cleansing cycle is not activated. As such, electrolytes do not flow between the positive and negative electrolyte chambers. If the battery capacity is determined to be less than the target battery capacity, then the method 400 proceeds from 410 to 420.

At 420, method 400 includes triggering (e.g., activating) the redox flow battery system cleansing cycle. During the cleansing cycle at 420, rebalancing systems are activated to aid in more quickly reducing the electrolytes' state of charge. Activating the rebalancing systems may include one or more of the controller directing the electrolyte in the first electrolyte circuit 280 through one or more rebalancing reactors 80 fluidly connected in series thereto and/or in parallel thereto, and the controller directing the electrolyte in the second electrolyte circuit 282 through one or more rebalancing reactors 82 fluidly connected in series thereto and/or in parallel thereto. In addition, 420 includes the controller automatically placing the redox flow battery system into discharge mode. In one example, if the battery is in an idle mode prior to 420 and the cleansing cycle triggering condition is met (e.g., the battery state of charge is determined to be less than the threshold target battery capacity), then the controller switches the battery to the discharge mode when the cleansing cycle is triggered. It will be appreciated that the battery SOC is monitored throughout a plurality of battery modes and/or operating conditions, wherein the controller may signal to trigger the cleansing cycle in response to the cleansing cycle triggering condition being met, such as when a battery SOC falls below the threshold target battery capacity.

In some examples, the method may further include determining a difference between the battery SOC and the threshold target battery capacity. For example, if the battery SOC is 70% of a fully charged battery SOC (e.g., 100% SOC) and the threshold target battery capacity is 90% of the full SOC, then the difference measured is 20%. Further still, the cleansing cycle triggering condition may include a difference between a battery SOC and a fully charged battery SOC being greater than a threshold SOC difference. In one example, a threshold SOC difference may include 5%, or may include 3%.

Next, method 400 continues at 430 where both positive electrolyte state of charge and positive electrolyte pH are determined and compared to pre-determined set points. As an example, the positive electrolyte state of charge may be determined by optical scanner, and the positive electrolyte pH may be measured using a pH meter. If the positive electrolyte state of charge or positive electrolyte pH are determined to be greater than their respective pre-determined set points then method 400 is directed back to 420 and triggering of the system cleansing cycle is repeated and/or continued. As described above, the positive electrolyte pH set point may be selected to reduce a risk of $Fe(OH)_3$ precipitation resulting from mixing the positive electrolyte (having a lower pH) and negative electrolyte (having a higher pH). The positive electrolyte SOC set point may be selected to reduce an amount of Ferric ion being introduced into the negative electrolyte when the positive electrolyte is mixed with the negative electrolyte. When both positive electrolyte state of charge and pH are determined to be less than their respective pre-determined set points then the method 400 continues to 440.

At 440, method 400 includes the controller 88 adjusting the positions of one or more of the mixing valves 210 and 310, and adjusting the pump status of one or more of the electrolyte pumps 30 and 32 to direct electrolyte flow from the second electrolyte circuit 282 to the first electrolyte circuit 280. Adjusting the positions of one or more of the mixing valves 210 and 310 may include the controller sending a signal to open motor-controlled mixing valve 210 while activating the electrolyte pump 30 to direct flow of (e.g., positive) electrolyte from the second electrolyte circuit 282 into the first electrolyte circuit 280 and the negative electrolyte chamber 50 for a first threshold duration. Furthermore, the positive electrolyte pump 32 may be deactivated, particularly for the case where the redox flow battery system includes the flow circuit configuration 200 of FIG. 2 including orifice 220. As such, electrolytes may not be circulated by the positive electrolyte pump 32 through the second electrolyte circuit 282. In this way, electrolytes from the second electrolyte circuit 282 flow to and mix with electrolytes in the first electrolyte circuit 280 when the first mixing valve 210 is open and the negative electrolyte pump 30 is activated. Conversely, while the positive electrolyte pump 32 is deactivated, the circulating electrolytes in the first electrolyte circuit 280 may not flow to the second electrolyte circuit 282. Thus, at 440, the controller may adjust the positions of one or more of the mixing valves 210 and 310, and adjust the pump status of one or more of the electrolyte pumps 30 and 32 to direct electrolyte flow from the second electrolyte circuit 282 to the first electrolyte circuit 280 without directing electrolyte flow from the first electrolyte circuit 280 to the second electrolyte circuit 282.

In the case where the redox flow battery system includes the flow circuit configuration 300, adjusting the mixing valve positions and electrolyte pumps status to direct electrolyte from the second electrolyte circuit 282 to the first electrolyte circuit 280 may include closing the mixing valve 310 to block flow of electrolyte from the first electrolyte circuit 280 to the second electrolyte circuit 282. Furthermore, the electrolyte pump 32 may be activated to maintain circulation of the electrolyte in the second electrolyte circuit 282 while a portion of the electrolyte in the second electrolyte circuit 282 flows to the first electrolyte circuit 280 by way of the open mixing valve 210 and drawn from activated electrolyte pump 30. Because the mixing valve 310 is closed while the electrolyte pump 32 is on, electrolyte does not flow from the first electrolyte circuit 280 to the second electrolyte circuit 282.

Next, method 400 continues at 442 where the controller determines if a first threshold duration has elapsed. The first threshold duration may correspond to a duration for flowing a sufficient volume of the electrolyte from the second electrolyte circuit 282 to the first electrolyte circuit 280 and mixing thereof at the first electrolyte circuit 280 to maintain a redox flow battery system capacity above the pre-determined threshold target battery capacity. Accordingly, the first threshold duration may increase as the difference between the battery SOC and the threshold target battery capacity increases. For example, if the threshold target battery capacity is 90%, then the first threshold duration may be greater when the battery SOC is 70% compared to when the battery SOC is 80% at the time when the cleansing cycle is triggered. Additionally or alternatively, the first threshold duration may be fixed. In one example, the first threshold duration may include 500 seconds. If at 442, the controller determines that the first threshold duration has elapsed, method 400 continues at 444. For the case where the controller determines that the first threshold duration has not elapsed, method 400 returns to 440, where the adjusted mixing valve positions and electrolyte pumps statuses to direct electrolyte from the second electrolyte circuit to the first electrolyte circuit are maintained.

Method 400 continues at 444 where the controller may adjust the mixing valve positions to stop directing electrolyte from the second electrolyte circuit to the first electrolyte circuit. Stopping flow of electrolyte from the second electrolyte circuit to the first electrolyte circuit may include the controller closing the mixing valve 210 while the electrolyte pump 30 is maintained activated and ON to continue circulation of electrolyte (including electrolyte directed to the first electrolyte circuit 280 from the second electrolyte circuit 282 prior to elapsing of the first threshold duration).

Next, method 400 continues at 446 where the controller determines if a time delay has elapsed. In one example, the time delay includes fixed time delay. Alternatively, the time delay may be proportionally related to the first threshold duration, wherein as the first threshold duration increases, the time delay increases. In this way, electrolytes flow through only the first electrolyte circuit 280 during the time delay. Flowing electrolytes through only the first electrolyte circuit 280 during the time delay aids in more thorough mixing of the electrolytes in the first electrolyte circuit 280 during the time delay when no further electrolyte flows from the second electrolyte circuit 282 into the first electrolyte circuit 280. For the case where the time delay has not elapsed, method 400 returns to 444 where the adjusted mixing valve positions to stop flow of electrolyte from the second electrolyte circuit 282 to the first electrolyte circuit 280 are maintained. For the case where the controller determines that the time delay has elapsed, method 400 continues at 450.

At 450, method 400 includes the controller adjusting one or more of the positions of mixing valve 210 and 310, and adjusting the electrolyte pumps statuses to promote electrolyte flow from the first electrolyte circuit 280 to the second electrolyte circuit 282. Promoting electrolyte flow from the first electrolyte circuit 280 to the second electrolyte circuit 282 may include the controller closing the motor-controlled mixing valve 210, deactivating the electrolyte pump 30, and activating the electrolyte pump 32. Activating the electrolyte pump 32 while deactivating the electrolyte pump 30 when the mixing valve 210 is closed promotes drawing of the electrolyte from the first electrolyte circuit 280 to the second electrolyte circuit 282. In the case where the redox flow battery system 10 includes the flow circuit configuration 300, promoting electrolyte flow from the first electrolyte circuit 280 to the second electrolyte circuit 282 may further include the controller opening the motor-controlled mixing valve 310. After mixing valve 210 is closed, negative electrolyte may be allowed to flow from the first electrolyte circuit 280 to the second electrolyte circuit 282, including electrolyte flowing from the negative electrolyte chamber 50 to the positive electrolyte chamber 52 by way of either orifice 220 (in the case where redox flow battery system 10 includes flow circuit configuration 200) or mixing valve 310 (in the case where redox flow battery system 10 includes flow circuit configuration 300).

In the example of flow circuit configuration 200, step 450 includes flowing electrolyte from the first electrolyte circuit 280 to the second electrolyte circuit 282 including the positive electrolyte chamber 52 by way of the orifice 220 (sized for a particular electrolyte mixing rate). In the example of flow circuit configuration 300, step 450 includes the controller opening motor-controlled mixing valve 310 to direct electrolyte back to the positive electrolyte chamber 52.

Next, method 400 continues at 456 where the controller determines if a second threshold duration has elapsed. The second threshold duration may correspond to a duration during which a volume of electrolyte can flow from the first electrolyte circuit 280 to the second electrolyte circuit 282 to balance an electrolyte volume in both of the first and second electrolyte circuits 280 and 282. In one example, the second threshold duration may be equal to the first threshold duration. Alternatively, in the case where the redox flow battery system 10 include the flow circuit configuration 200, the second threshold duration may be based on a combination of a sizing of the orifice 220 and the first threshold duration. The orifice 220 may be sized to adjust a flow rate from the first electrolyte circuit 280 to the second electrolyte circuit 282, and/or the orifice 220 may be sized based on a flow rate of the negative electrolyte pump 30. In one example, the orifice 220 is sized to provide a flow rate between the first 280 and second 282 electrolyte circuits substantially equal to a flow rate of the negative electrolyte pump 30. In one example, a mixing rate between the first 280 and second 282 electrolyte circuits increases as a size of the orifice 220 increases. As a diameter (e.g., cross-sectional diameter transverse to main flow direction) of the orifice increases, a flow rate of electrolyte from the first electrolyte circuit 280 to the second electrolyte circuit 282 may be higher; conversely, as a diameter (e.g., cross-sectional diameter transverse to main flow direction) of the orifice decreases, a flow rate of electrolyte from the first electrolyte circuit 280 to the second electrolyte circuit 282 may be lower. When the controller determines that the second threshold duration has not elapsed, method 400 returns to 450 where the controller maintains the adjusted mixing valve positions and electrolyte pump statuses to promote electrolyte flow from the first electrolyte circuit 280 to the second electrolyte circuit 282. For the case where the second threshold duration has elapsed, method 400 continues to 460.

Method 400 continues at 460 where the controller determines if a redox flow battery state of charge is determined and compared to a pre-set value, second threshold SOC, $SOC_{TH2}$. For example, if the battery state of charge is determined by the controller to be higher than the pre-set value, then method 400 returns to step 440 where one or more of the mixing valve positions and the electrolyte pumps statuses are adjusted to direct electrolyte flow from the second electrolyte circuit 282 to the first electrolyte circuit 280. Thus, electrolyte flow is reversed and electrolytes flow from the positive electrolyte chamber 52 to the negative electrolyte chamber 50. At 460, for the case where battery state of charge is determined by the controller to be less than the pre-set value, $SOC_{TH2}$, then method 400 continues at 470. In one example, the pre-set value $SOC_{TH2}$ is less than a threshold lower target battery capacity. For example, if the threshold lower target battery capacity is 2%, then the pre-set value $SOC_{TH2}$ may be less than 2%.

At 470, the controller determines that the redox flow battery system 10 is ready for returning to charge/discharge/idle operation as described with reference to FIG. 1. As such, in the case where the redox flow battery system 10 includes the flow circuit configuration 300, the controller may adjust a position of the second mixing valve 310 to the fully closed position. Thus, after 470, both the mixing valves 210 and 310 are in the fully closed positions and electrolytes are blocked from flowing between the first electrolyte circuit 280 and the second electrolyte circuit 282, including between the positive electrolyte chamber 52 and the negative electrolyte chamber 50. Next at 474, the controller may end the cleansing cycle and may return operation of the redox flow battery system 10 to charging/discharging/idle mode. Returning operation of the redox flow battery system 10 to charging/discharging/idle mode may include the controller activating one or more of electrolyte pumps 30 and 32 to recirculate electrolyte between the negative and positive electrolyte chambers 50 and 52 and the negative and positive electrode compartments 20 and 22, respectively. After 474 and 415, method 400 ends.

FIG. 5 is a graph showing the performance comparison of an example redox iron flow battery (IFB) system including the flow circuit configuration of FIG. 2 or FIG. 3, and operated according to the cleansing method described herein, versus a typical lithium ion battery. In the figure, percent battery capacity is graphed on the y-axis versus number of cycles on the x-axis, for both a redox iron flow battery system and a lithium ion battery. The graph illustrates that over the course of >10,000 cycles, the IFB redox flow battery system experiences virtually no loss in capacity. In contrast, the lithium ion battery steadily loses capacity, cycle to cycle, and that after 10,000 cycles has lost ~45% of its total capacity. The results depicted in the figure clearly demonstrate the benefits of the cleansing method for an IFB redox flow battery system described herein. The results show that the IFB system is able to operate at full capacity for >10,000 cycles, and that this system's mitigation of capacity degradation is superior to a lithium ion battery system which will have poor operating performance and therefore require replacement after a significantly fewer number of cycles.

In this way, the systems and methods described herein may achieve a technical effect of maintaining increased redox flow battery system electrolyte health, including reduced battery system capacity degradation caused by repeated and cyclic charging and discharging, as compared with conventional battery systems. In particular, the systems and methods described herein enable operation of redox flow battery systems for an increased number of cycles without experiencing a loss of capacity greater than a threshold capacity loss. Furthermore, the methods and systems described herein may be performed while utilizing existing electrolyte storage chambers, and without further additional electrolyte storage tanks, thereby reducing a system complexity and cost.

Thus, a method of operating a redox flow battery system includes circulating a positive electrolyte between a positive electrode compartment and a positive electrolyte chamber with a positive electrolyte pump, circulating a negative electrolyte between a negative electrode compartment and a negative electrolyte chamber with a negative electrolyte pump, and responsive to a first condition, including when a redox flow battery capacity is less than a threshold battery capacity, performing a battery cleansing cycle, including mixing the positive electrolyte with the negative electrolyte until a redox flow battery state of charge (SOC) is less than a threshold SOC. In a first example of the method, the first condition further includes when a SOC of the positive electrolyte is less than a threshold discharge SOC. A second example of the method optionally includes the first example and further includes wherein the first condition further includes when a pH of the positive electrolyte is less than a threshold pH. A third example of the method optionally includes one or more of the first and second examples, and further includes wherein mixing the positive electrolyte with the negative electrolyte includes opening a first mixing valve to direct flow of the positive electrolyte from the positive electrolyte chamber to the negative electrolyte chamber. A fourth example of the method optionally includes one or more of the first through third examples, and further includes wherein mixing the positive electrolyte with the negative electrolyte includes activating the negative electrolyte pump while opening the first mixing valve. A fifth example of the method optionally includes one or more of the first through fourth examples, and further includes wherein mixing the positive electrolyte with the negative electrolyte includes deactivating the positive electrolyte pump while opening the first mixing valve. A sixth example of the method optionally includes one or more of the first through fifth examples, and further includes wherein mixing the positive electrolyte with the negative electrolyte includes opening the first mixing valve for a first threshold duration. A seventh example of the method optionally includes one or more of the first through sixth examples, and further includes wherein performing the battery cleansing cycle includes switching operation of the redox flow battery system to a discharge mode when a SOC of the positive electrolyte is greater than the threshold discharge SOC. An eighth example of the method optionally includes one or more of the first through seventh examples, and further includes wherein performing the battery cleansing cycle includes directing flow of the positive electrolyte through a rebalancing reactor when a pH of the positive electrolyte is greater than the threshold pH. A ninth example of the method optionally includes one or more of the first through eighth examples, and further includes, responsive to the first threshold duration elapsing, closing the first mixing valve and opening a second mixing valve to direct electrolyte from the negative electrolyte chamber to the positive electrolyte chamber.

Thus, a method of cleansing a redox flow battery system includes operating the redox flow battery system in a charge, discharge, or idle mode, and responsive to a redox flow battery capacity being less than a threshold battery capacity, switching the redox flow battery system to operate in the discharge mode, and reducing electrolyte state of charge (SOC) by directing positive and negative electrolytes to flow through rebalancing reactors. In a first example, the method may include, responsive to a SOC and a pH of the positive electrolyte being less than a threshold positive electrolyte SOC and a threshold pH, respectively, mixing the positive electrolyte with the negative electrolyte. A second example of the method optionally includes the first example, and further includes wherein mixing the positive electrolyte with the negative electrolyte includes flowing electrolytes from a positive electrode compartment to a negative electrode compartment for a first threshold duration. A third example of the method optionally includes one or more of the first and second examples, and further includes after the first threshold duration elapses, flowing electrolytes from the negative electrode compartment to the positive electrode compartment for a second threshold duration. A fourth example of the method optionally includes one or more of the first through third examples, and further includes fluidly isolating the negative electrode compartment and the positive electrode compartment for a time delay following the first threshold duration and prior to the second threshold duration. A fifth example of the method optionally includes one or more of the first through fourth examples, and further includes wherein the first threshold duration increases with a difference between the redox flow battery capacity and the threshold battery capacity.

Thus, a redox flow battery system includes a redox flow battery cell with a positive electrode compartment and a negative electrode compartment, a mixing valve fluidly coupled between the positive electrode compartment and the negative electrode compartment, positive and negative electrolyte pumps for circulating electrolyte through the positive electrode compartment, and a controller, including executable instructions stored in memory thereon to, responsive to a redox flow battery capacity being less than a threshold battery capacity, perform a battery cleansing cycle, including mixing the positive electrolyte with the negative electrolyte. In a first example of the redox flow battery system, the executable instructions to mix the positive electrolyte with the negative electrolyte include opening the mixing valve for a first threshold duration while activating the negative electrolyte pump and deactivating the positive electrolyte pump. A second example of the redox flow battery system includes the first example and further includes wherein the executable instructions further include, after the first threshold duration, closing the mixing valve while deactivating the negative electrolyte pump and activating the positive electrolyte pump. A third example of the redox flow battery system includes one or more of the first and second examples and further includes wherein the executable instructions further include stopping the battery cleansing cycle when a redox flow battery state of charge (SOC) is less than a threshold SOC.

Note that the example control and estimation routines included herein can be used with various battery configurations. The control methods and routines disclosed herein may be stored as executable instructions in non-transitory memory and may be carried out by the control system including the controller in combination with the various sensors, actuators, and other battery hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various battery hardware components in combination with the electronic controller.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a redox flow battery system, including:
   circulating a positive electrolyte in a positive electrolyte circuit between a positive electrode compartment and a positive electrolyte chamber with a positive electrolyte pump,
   circulating a negative electrolyte in a negative electrolyte circuit between a negative electrode compartment and a negative electrolyte chamber with a negative electrolyte pump, and
   responsive to a cleansing condition being met, including
      when a redox flow battery capacity is less than a threshold redox flow battery capacity,
      when a discharge state of charge (SOC) of the positive electrolyte is less than a threshold discharge SOC, wherein the discharge SOC of the positive electrolyte corresponds to a SOC of the positive electrolyte during a discharge mode of the redox flow battery system, and
      when a pH of the positive electrolyte is less than a threshold positive electrolyte pH,
      performing a redox flow battery cleansing cycle, including mixing the positive electrolyte with the negative electrolyte while ion compositions of the positive electrolyte and the negative electrolyte are substantially similar, wherein mixing the positive electrolyte with the negative electrolyte includes,
         opening a first mixing valve and directing flow of electrolyte from the positive electrolyte circuit to the negative electrolyte circuit, and
         opening a second mixing valve and directing flow of electrolyte from the negative electrolyte circuit to the positive electrolyte circuit after flowing the electrolyte from the positive electrolyte circuit to the negative electrolyte circuit.

2. The method of claim 1, wherein mixing the positive electrolyte with the negative electrolyte includes activating the negative electrolyte pump while opening the first mixing valve.

3. The method of claim 2, wherein mixing the positive electrolyte with the negative electrolyte includes deactivating the positive electrolyte pump while opening the first mixing valve.

4. The method of claim 3, wherein mixing the positive electrolyte with the negative electrolyte includes opening the first mixing valve for a first threshold duration.

5. The method of claim 1, further comprising, in response to the cleansing condition being met, switching operation of the redox flow battery system to the discharge mode prior to mixing the positive electrolyte with the negative electrolyte.

6. The method of claim 1, further comprising, in response to the cleansing condition being met, directing flow of the positive electrolyte through a rebalancing reactor prior to mixing the positive electrolyte with the negative electrolyte.

7. The method of claim 4, wherein opening the second mixing valve and directing flow of the electrolyte from the negative electrolyte circuit to the positive electrolyte circuit after flowing the electrolyte from the positive electrolyte circuit to the negative electrolyte circuit further comprises, responsive to the first threshold duration elapsing, closing the first mixing valve and opening the second mixing valve to direct electrolyte from the negative electrolyte chamber to the positive electrolyte chamber.

8. The method of claim 1, wherein the cleansing condition being met further includes when a difference between the redox flow battery capacity and the threshold redox flow battery capacity is greater than a threshold redox flow battery capacity difference.

9. The method of claim 1, wherein the cleansing condition being met further includes when a charge current of the redox flow battery system is less than a threshold charge current.

10. The method of claim 1, wherein the cleansing condition being met further includes when a discharge current of the redox flow battery system is less than a threshold discharge current.

11. The method of claim 4, wherein mixing the positive electrolyte with the negative electrolyte further includes adjusting the first threshold duration based on a difference between the redox flow battery capacity and the threshold redox flow battery capacity, including increasing the first threshold duration when the difference between the redox flow battery capacity and the threshold redox flow battery capacity is larger and decreasing the first threshold duration when the difference between the redox flow battery capacity and the threshold redox flow battery capacity is smaller.

12. The method of claim 4, wherein mixing the positive electrolyte with the negative electrolyte further includes, after the first threshold duration elapses, recirculating electrolyte in the negative electrolyte circuit without directing flow of electrolyte from the positive electrolyte circuit to the negative electrolyte circuit for a threshold time delay.

13. The method of claim 12, further comprising increasing the threshold time delay in response to a longer first threshold duration, and decreasing the threshold time delay in response to a shorter first threshold duration.

14. The method of claim 1, wherein the redox flow battery system includes an all iron redox flow battery system, wherein the threshold discharge SOC corresponds to a SOC of the positive electrolyte at which the positive electrolyte is free of ferric ion.

15. The method of claim 1, further comprising, after opening the second mixing valve and directing flow of the electrolyte from the negative electrolyte circuit to the positive electrolyte circuit, in response to a redox flow battery SOC being less than a lower threshold redox flow battery SOC, stopping electrolyte flow between the positive electrolyte circuit and the negative electrolyte circuit.

16. The method of claim 15, further comprising, after opening the second mixing valve and directing flow of the electrolyte from the negative electrolyte circuit to the positive electrolyte circuit, in response to the redox flow battery SOC being greater than the lower threshold redox flow battery SOC after a second threshold duration elapses,
   closing the second mixing valve and stopping the directing of flow of the electrolyte from the negative electrolyte circuit to the positive electrolyte circuit, and
   reopening the first mixing valve and directing flow of electrolyte from the positive electrolyte circuit to the negative electrolyte circuit.

* * * * *